May 13, 1958　　　C. P. GOODMAN　　　2,834,319
BROODERS
Filed Sept. 11, 1956　　　　　　　　　　　2 Sheets-Sheet 1
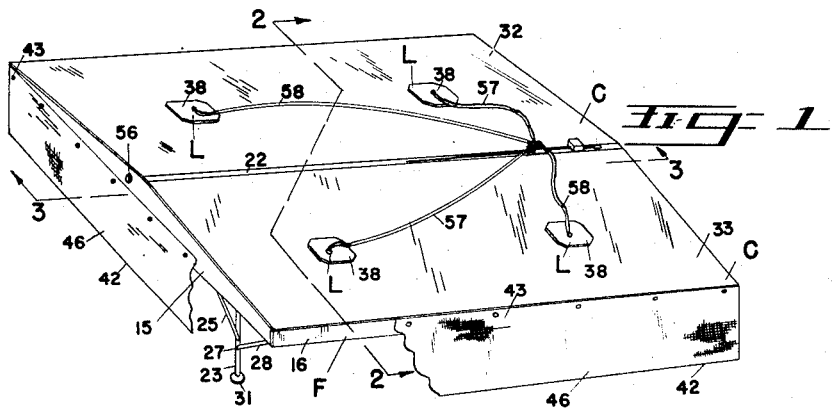
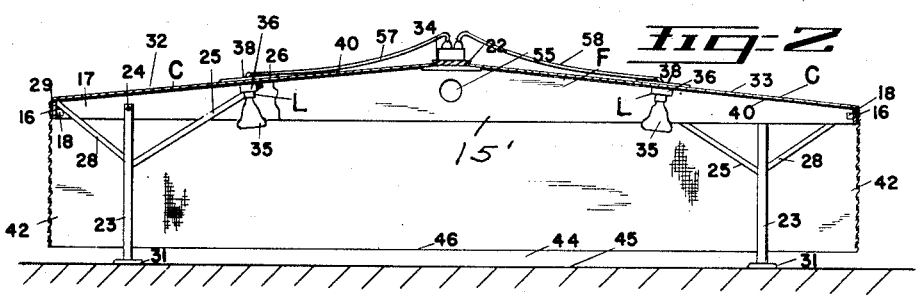
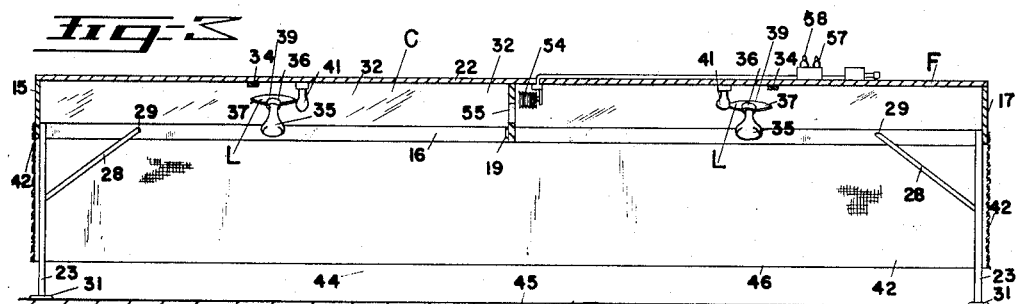
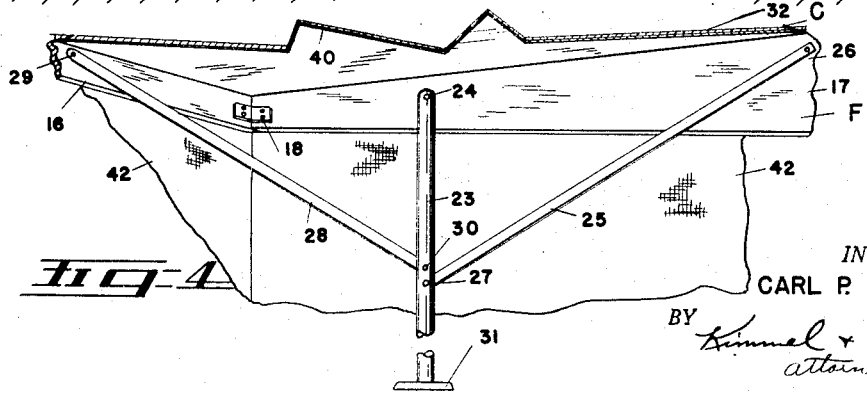
INVENTOR.
CARL P. GOODMAN
BY Kimmel & Crowell
attorneys May 13, 1958     C. P. GOODMAN     2,834,319
BROODERS
Filed Sept. 11, 1956     2 Sheets-Sheet 2
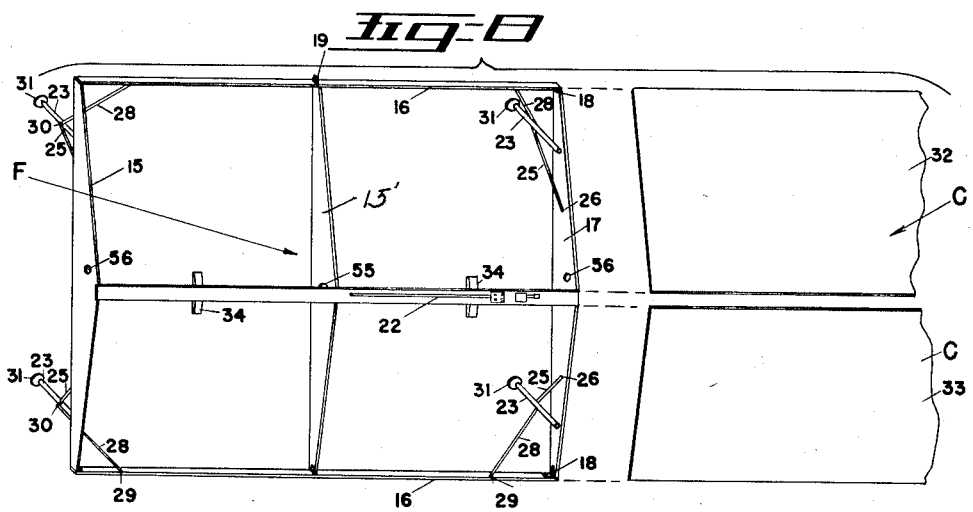
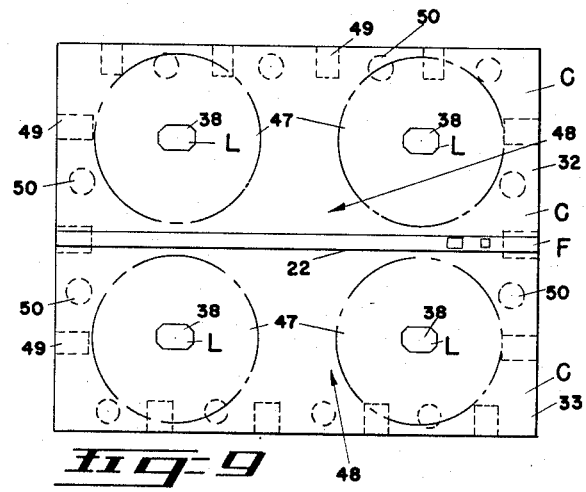
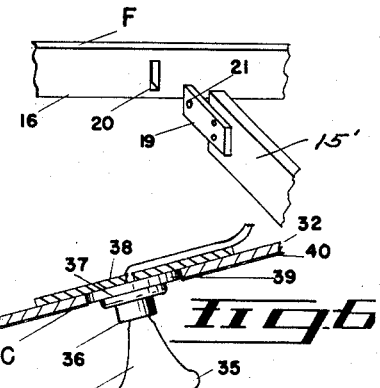
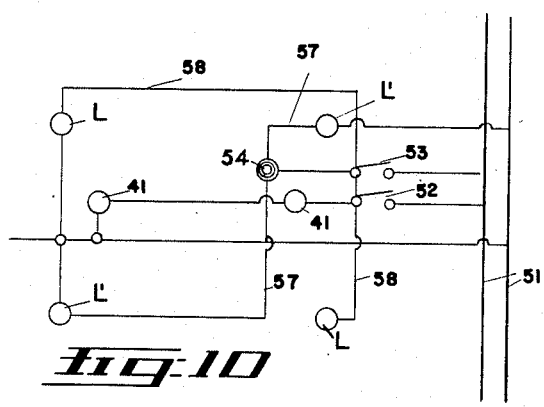
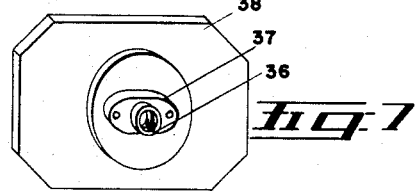
INVENTOR.
CARL P. GOODMAN
BY
Kimmel + Crowell
attorneys

United States Patent Office 2,834,319
Patented May 13, 1958

2,834,319

BROODERS

Carl P. Goodman, Tigard, Oreg.

Application September 11, 1956, Serial No. 609,247

2 Claims. (Cl. 119—33)

The present invention relates to improvements in brooders, and more particularly to brooders adapted for the brooding of poultry stock, such as chicks.

The primary object of this invention is to provide a brooder structure that will effectively fill the varying heat needs of the brooding chicks including weak and strong chicks.

In brooders of today, normally most of the heat is directed under the central area of the brooder. This attracts the weaker chicks to this area, due to the fact that they require more heat, the strong chicks spread to the periphery at a distance from the central location of the brooder, as these strong chicks require less heat. One of the difficulties encountered in such brooders is that the weaker chicks, when hungry, have difficulty in working their way out through the strong chicks to reach their feeding troughs, which are usually located around the outer periphery of the brooder. Many of these weaker chicks are lost due to their inability to reach their food, therefore a major object of this invention is to distribute a greater amount of heat adjacent the periphery of the brooder to thus cause the strong chicks to more or less gather in the cooler central part of the brooder, and the weaker chicks will spread towards the warmer periphery of the brooder closer to their food supply.

It has been found that infra red heat lamps are best suited for the warming of brooders, since they have a beneficial effect upon the chicks in addition to the heat, and it also has been found that light, also available in such lamps, is very essential in the brooding of chicks.

In order to further carry out these objects, the ceiling of the brooder is lined with aluminum foil, or the like, which tends to reflect light evenly throughout the entire area of the brooder.

Other objects and advantages will become apparent in the following specification when considered in the light of the attached drawings, in which:

Figure 1 is a perspective view of my invention, partially broken away for convenience of illustration.

Figure 2 is a transverse sectional view, taken on line 2—2 of Figure 1, looking in the direction of the arrows.

Figure 3 is a longitudinal sectional view, taken on line 3—3 of Figure 1, looking in the direction indicated.

Figure 4 is an enlarged fragmentary inverted perspective view of one corner of the brooder.

Figure 5 is an enlarged fragmentary enlarged perspective detail illustrating the connection of the frame of the brooder.

Figure 6 is an enlarged fragmentary sectional view, illustrating the mounting of the infra red heat lamps in the top of the brooder.

Figure 7 is an enlarged perspective inverted view of one of the heat lamp holding brackets removed from the brooder.

Figure 8 is an exploded plan perspective view of the invention.

Figure 9 is a diagrammatical plan view of the brooder, illustrating the heat zones in relation to the feeding troughs.

Figure 10 is a wiring diagram of the electric supply into the heat lamps, light lamps and thermostatic control.

Referring now to the drawings in detail wherein like reference characters indicate like parts throughout the several figures, the reference character F indicates generally the framework of my new and improved poultry brooder having covers C supported thereon. The framework F comprises parallel transverse beams 15, 15' and 17. The transverse beams 15 and 17 have their ends connected to the ends of the side rails 16 by angle clips 18, referring particularly to Figure 4. The central beam 15' has its ends connected to the side rails 16 by tongues 19, which pass through the openings 20 of the side rails 16 and are secured thereto by a dowel pin, not here shown, which passes through a hole 21 in the tongue 19 on the outside of the rail 16.

A ridge rail 22 is secured to the upper surface of the beams 15, 15' and 17 by angle clips (not shown), similar to the angle clips 18.

Referring now to Figure 4, supporting legs 23 are fixedly secured to the opposite end portions of the beams 15 and 17 by bolts 24 are are braced thereon by the braces 25, which are secured to the transverse beams 15 and 17 at 26 and to the legs 23 at 27. Each leg 23 is provided with a brace 28 secured to the side rail 16 at 29 at one end, and to the leg 23 at 30 at the other end.

The bottom of the legs 23 have feet 31 mounted thereon, which engage the ground surface. The legs 23 are preferably made from pipe or the like, while the beams 15, 15' and 17 and side rails 16 are preferably made from plywood, making a very light brooder so that the same can be easily handled.

When the framework F is assembled, the covers C, consisting of sheets of plywood 32 and 33 are brought down on to the upper edges of the beams 15, 15' and 17, and the side rails 16, their adjacent edges coming to rest on supporting bars 34, which are secured to the underside of the rail 22. This provides a very stable assembly, but yet light in weight.

Instead of supporting the brooder upon the legs 23, the brooder can be supported by conventional hangers, not here shown, and still carry out the object of my invention.

Referring to Figures 6 and 7 particularly, the heat light assemblies are indicated by the letter L, and consists of a heat lamp 35. The lamp 35 is adapted to screw into a Bakelite socket 36, which is secured to a disk of plywood 37 which was cut from the cover sheets C. The disk 37 is fixedly secured to a plywood backing 38, which rests on the surface of the cover C, as best illustrated in Figure 6. The heat lamp 35 is inserted through the opening 39 of the cover C, thus making a simple way of replacing the heat lamps 35 from outside the brooder.

A sheet of aluminum foil 40 is secured to the underside of the cover C by any suitable means, and provides a reflecting surface for directing the heat and light downwardly into the brooder. Light lamps 41 are preferably secured to the underside of the rail 22 and provide light throughout the brooder at all times.

A flexible curtain 42 surrounds the lower part of the brooder and is removably secured to the rails 16 and to the transverse beams 15 and 17 by snap fasteners 43. The usual space 44 exists between the ground surface 45 and the lower edge 46 of the curtains 42 for allowing the chicks to pass underneath into and out of the brooder.

Referring to Figure 9, a diagrammatical illustration is made regarding the heat zones under the heat lamps 35. These zones are indicated by the broken lines 47, the space 48 between these zones is somewhat cooler, and in this space 48 the strong chicks tend to congregate, while the weaker chicks gather within the warmer zone 47.

The feeding troughs are indicated by broken lines 49 while the water troughs are indicated by broken lines 50, being relatively close to the heat zones 47 where the weaker chicks gather and where they will reach these feeding stations easily.

The electric circuit as seen in Figure 10 for supplying energy to the heat lamps L, and to the light lamps 41 will now be described. Electrical energy is supplied to the brooder from the supply lines 51 in the following manner. The light lamps 41 receive their energy through a manual switch 52 from the lines 51. The heat lamps 35 receive their energy through a manual switch 53. The heat assemblies L' are controlled by a thermostat 54, while the heat assemblies L are maintained in constant operation through the manual switch 53. This system of controlling the electrical energy has been found to be very efficient, although I would not wish to be limited to this circuit.

In the operation of the broder, it has been found that the chicks can be placed under the brooder soon after the heat lamps 35 have been turned on, due to the efficient radiation of heat directed on the backs of the chicks. This provides a saving and much time in the preparation of the brooder, as most brooders have to be turned on approximately 12 to 24 hours in advance to distribute the heat within the brooder.

It has also been found that it requires less energy to heat this type of brooder than has heretofore been the case. The thermostat 54 is set for the proper temperature to be maintained within the brooder and will control the heat assemblies L' intermittently, depending upon the heat requirements.

The thermostat 54, referring to Figure 3, is secured to the under surface of the rail 22 and adjacent the cross rail 16. An opening 55 is provided in the cross rail 16 for allowing air circulation adjacent the thermostat 54 for more efficient control.

The operator can observe the chicks through the peep holes 56 located on either end of the brooder.

Having thus described the preferred embodiment of the invention, it should be understood that numerous structural modifications and adaptations may be resorted to without departing from the scope of the appended claims.

What is claimed is:

1. A brooder comprising a rectangular framework including a pair of spaced parallel horizontal side rails connected at their opposite ends by a pair of parallel transverse beams, a central beam intermediate said pair of beams and parallel thereto extending between and connecting the mid-points of said side rails, said beams each having upwardly sloping centrally converging upper edges, a plurality of depending legs supporting said framework, a pair of plywood roof panels secured to the sloping upper edges of said beams, an aluminum foil sheet supported in intimate contact with the under surface of each of said plywood panels, a peripheral curtain depending from said framework, a plurality of infra red radiant heating lamps suspended from said roof panels in widely spaced relation for establishing heat zones within said brooder of different temperatures with the zones having a higher temperature at points spaced outwardly from the axial center of the brooder, means automatically controlling actuation of a portion of said lamps, and means for manually controlling actuation of the remaining portions of said lamps.

2. A device as claimed in claim 1 wherein said panels are provided with a plurality of apertures and said lamps are secured to plates supported on said panels with said lamps extending through said apertures.

References Cited in the file of this patent

UNITED STATES PATENTS

| | | |
|---|---|---|
| 2,115,617 | Brembeck et al. | Apr. 26, 1938 |
| 2,281,776 | Lyon | May 5, 1942 |
| 2,512,875 | Reynolds | June 27, 1950 |
| 2,787,697 | Muehfeld | Apr. 2, 1957 |
| 2,799,764 | Chandler | July 16, 1957 |

FOREIGN PATENTS

| | | |
|---|---|---|
| 618,893 | Great Britain | Mar. 1, 1949 |